July 1, 1952
R. G. NELB
2,602,037
FIREPROOF LAMINATED RESINS
Filed Dec. 21, 1950
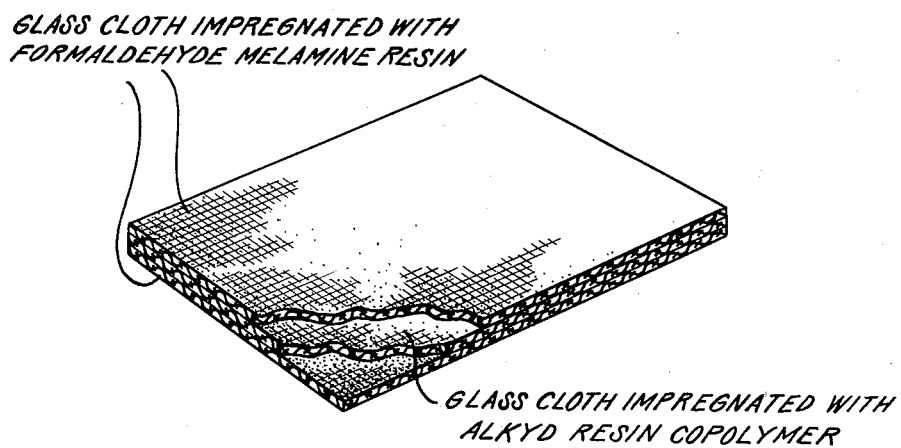
INVENTOR.
ROBERT G. NELB
BY
ATTORNEY Patented July 1, 1952

2,602,037

UNITED STATES PATENT OFFICE 2,602,037

FIREPROOF LAMINATED RESINS

Robert G. Nelb, Naugatuck, Conn., assignor to United States Rubber Company, New York, N. Y., a corporation of New Jersey Application December 21, 1950, Serial No. 202,010

6 Claims. (Cl. 154—128)

This invention relates to improvements in the manufacture of fire-resistant resin-impregnated laminates having a filler reinforcement of continuous construction for which the resin impregnant or saturant is called the binder.

Such filler reinforcements are of various character and include sheets or rolls of paper, asbestos, woven fabric constructions of fibres of cotton, glass, asbestos, or synthetic organic materials such as nylon. The filler can also be of mat construction. The preferred filler is glass cloth (Fiberglas).

The present invention resides broadly in such a laminate produced by simultaneously curing a ply of filler reinforcement impregnated with a formaldehyde-melamine resin on the face of and together with a central core of one or more plies of the filler reinforcement impregnated with a copolymer of an unsaturated alkyd resin, i. e., a polyhydric alcohol polyester of an olefin alpha, beta-dicarboxylic acid and a miscible copolymerizable ethylenic compound containing the terminal group $CH_2=C<$. A preferred alkyd is poly(ethylene maleate) to be copolymerized with either styrene, diallyl phthalate, or triallyl cyanurate, the latter giving extremely good results, namely, an integrated laminate of good strength and ply adhesion, and which is self-extinguishing in a vertical flame test.

Various types of formaldehyde-melamine resins are known and can be used. Various types of unsaturated polyester type alkyds to be used are also known and known to be copolymerized with various vinyl and allyl-type monomers to produce cross-linked resin copolymers; see, for example, U. S. Patents Nos. 2,255,313, 2,443,736 to 2,443,741. The present invention resides in the combination of contrasting known materials in a single integrated structure to overcome disadvantages which would reside in each if used alone for the purpose.

Polyester resins, for example, the copolymer of the alkyd of ethylene glycol and maleic anhydride (poly(ethylene maleate)) copolymerized with, for example, styrene, are widely used as laminates with glass-cloth. While these resins have the advantages of ease of fabrication and great strength, they are inflammable. Heretofore, this inflammability has been reduced by incorporating highly halogenated materials (tetrachlorophthalic anhydride, octachloronaphthalenes), or by the use of substantial quantities of an inert filler (such as antimony oxide or tricresyl phosphate). The first reduces the color stability, and the latter lowers the strength of the resin.

It has now been found that a laminate having superior fire resistance without loss of color stability or strength can be readily made by fabricating the inner core from the polyester resin, and the outer layers from a melamine-formaldehyde resin.

The laminate is made by first impregnating layers of, for example, glass cloth with the ester resin. On either side of this core or central laminate, a ply of glass cloth, which has been impregnated with an aqueous solution of the melamine resin and then dried, is applied. The final laminate is then ready for curing, usually at a relatively low pressure, such as 50 lbs. per square inch. The resultant cured laminate possesses the structural strength and rigidity characteristic of polyester resins, and in addition is quite fire resistant.

The figure in the drawing illustrates in broken perspective view the cured laminated assembly using single plies.

The following examples are given to illustrate the best modes of the invention, without limitation thereto, parts being by weight.

*Example 1.—Preparation of melamine-formaldehyde resin*

The melamine-formaldehyde resin used in this work may be prepared by reacting melamine (126 parts, 1 mole) and 37% aqueous formaldehyde (243 parts, 3 moles) at a pH of 6.3. The reaction mixture is heated up to about 80° C. over about ½ hour. The temperature is then allowed to drop to about 60° C. and is maintained at 60° C. for ½ hour. The syrup is adjusted to a pH of 8 to 8.5, and it is filtered to remove any insoluble impurities which may be present. The resin syrup is concentrated by heating under a vacuum of 9–10 inches of mercury absolute pressure. When the syrup is substantially dehydrated, it is cooled and ground to a fine white powder which is soluble in water.

Unsaturated alkyd resins suitable for use in accordance with the present invention are those which, as described by the prior art, are polyesters of an alpha, beta-unsaturated dicarboxylic acid with a polyhydric alcohol. Glycols are preferably used as the polyhydric alcohol, and examples of these are: ethylene glycol, diethylene glycol, triethylene glycol, trimethylene glycol, alpha-propylene glycol, octadecandiol, decamethylene glycol, neopentyl glycol, etc. Mixtures of the glycols may be used and the polyesters may be modified with monohydric alcohols and/or monocarboxylic acids.

While any of the alpha, beta-unsaturated dicarboxylic acids, including fumaric acid, itaconic acid and citraconic acid, may be used, maleic anhydride is preferred. Part of the alpha, beta-unsaturated dicarboxylic acid may be replaced by other polycarboxylic acids, including succinic acid, adipic acid, sebacic acid, phthalic acid, endomethylenetetrahydrophthalic anhydride, etc. The use of a dicarboxylic acid which does not contain an alpha, beta-unsaturation subject to polymerization is desirable in order to modify the characteristics of the vinyl polymer and in some cases in order to obtain compatibility with the substances containing the $CH_2=C<$ group with which it is copolymerized.

The term "acid" as used herein is intended to cover anhydride which may be used in place of the acid whenever available.

The unsaturated alkyd resins should preferably have an acid number below 100, and preferably below 60, to maintain reasonably good compatibility of the unsaturated alkyd with the cross-linking monomer.

The polyester resin mixture as used for preparing the laminates consists of a blend of one or more of the unsaturated alkyd resins and one or more cross-linking agents, such as styrene. The optimum concentration of cross-linking agent used depends upon the nature of the unsaturated alkyd, its compatibility with the monomer, and the nature of the cross-linking monomer. In general, it is desirable to have sufficient monomer present to make the viscosity of the blend easily handled (ca. 50 poises). Concentrations of cross-linking monomer between 10 and 100 parts per 100 parts of unsaturated alkyd are commonly used, but it is to be understood this range of concentration may be varied without limiting the scope of this invention.

The styrene may be replaced by other substances containing the $CH_2=C<$ group and preferably those which have a boiling point above 100° C. Examples of such substances are vinyl hydrocarbons including o-, m-, p-methyl styrenes, alphamethyl styrene, 2,4-dimethyl styrene, 2,3-dimethyl styrene, 2,5-dimethyl styrene, 2,6-dimethyl styrene, 3,4-dimethyl styrene, the isopropenyl toluenes, vinyl naphthalene, divinyl benzene, etc.; and the polyallyl esters such as diallyl phthalate, diallyl terephthalate, diallyl sebacate, diallyl succinate, diallyl maleate, diallyl fumarate, triallyl phosphate, triallyl tricarballylate, triallyl cyanurate, trimethallyl cyanurate, diallyl ester of ethylene glycol carbonate, etc. Mixtures of substances containing the $CH_2=C<$ group may be used, if desired.

Example 2 (a)—Preparation of polyester resin A

Polyester resin A is prepared by reacting ethylene glycol (283 parts), maleic anhydride (175 parts), and phthalic anhydride (264 parts) at 170–180° C. for 4 to 5 hours and then at 200–210° C. until the acid number is below 35. The alkyd is discharged into the blender, cooled to 90° C., stabilized with hydroquinone (0.033 part), and finally blended with styrene (330 parts).

Example 2 (b)—Preparation of polyester B

Polyester resin B is prepared by refluxing a solution of ethylene glycol (142 parts), maleic anhydride (450 parts) and hydroquinone (0.06 part) at 180–200° C. for 4 hours. A second charge consisting of ethylene glycol (145 parts) and hydroquinone (0.06 part) was then added and the heating was continued for 4 more hours. The yield was 657 parts of a white, waxy solid, M. P. about 60° C., acid number 70.3, saponification number 762. The alkyd (100 parts) was blended with triallyl cyanurate (105 parts) at 70° C.

Preparation of and test of the laminate

Five plies of Fiberglas-cloth are impregnated with the polyester resin mix to which has been added a peroxide catalyst, such as benzoyl peroxide. The outer plies of melamine-formaldehyde impregnated glass cloth are prepared by dipping individual Fiberglas-cloth plies in a solution of melamine-formaldehyde resin in water, having a concentration of approximately 60% of solids, drying in a circulating air oven at 120° C. for approximately 10 minutes. Single plies of these melamine impregnated sheets are placed onto the outer faces of the polyester core and the sandwich is then cured between chrome plates for 1 hour at 120° C. and 50 p. s. i. The resulting panel is a well-cured laminate with excellent ply-adhesion, even between the interfaces of the two dissimilar resins. Although the polyester resin itself is highly inflammable, the melamine-faced polyester is self-extinguishing in a vertical flame test and will not ignite at all when a flame is impinged on the face of the panel. Details and results are given in Table I and Table II.

TABLE I

| Resin | Time in Flame (seconds)[1] | Burning Time (seconds) | Length Burned |
|---|---|---|---|
| | | | Inches |
| Polyester A | 10 | 113 | 4 |
| | 10 | 120 | 4 |
| Melamine-faced Polyester A | 20 | [2] 46 | 1 |
| Polyester B | 10 | 85 | 4 |
| | 10 | 78 | 4 |
| Melamine-faced Polyester B | 20 | [2] 27 | ½ |
| | 30 | [2] 33 | 1 |

[1] The sample 4 x ½ x ⅛ inches was supported vertically and ignited in an oxidizing Bunsen Burner flame having a half-inch inner cone.
[2] Self-extinguishing.

TABLE II

| | Polyester A | A Melamine-Faced Polyester A | Polyester B | A Melamine-Faced Polyester B | A Melamine |
|---|---|---|---|---|---|
| Plies of Fiberglas-cloth | 7 | [1] 7 | 7 | [1] 7 | 7 |
| Pressure of Cure, p. s. i. | 50 | 50 | 50 | 50 | 50 |
| Temperature of Cure, °C | 120 | 120 | 120 | 120 | 120 |
| Resin Content of Cure Laminate, percent | 30 | 37 | 32 | 36 | 49 |
| Laminate Weight Loss after 10 hours at 260° C., percent | 13 | 9 | 3 | 6 | 7 |
| Flexural Strengths at Room Temperature—Hours Aged at 260° C.: | | | | | |
| 0 | 50,400 | 40,200 | 35,100 | 39,000 | 41,800 |
| 1 | 44,800 | 23,100 | 43,200 | 29,000 | 19,500 |
| 5 | 32,300 | 20,300 | 40,100 | 29,900 | 19,400 |
| 10 | 25,200 | 15,200 | 41,700 | 27,900 | 19,400 |
| Flexural Strengths at 260° C. after 0.5 hour at 260° C.—Hours Aged at 260° C.: | | | | | |
| 0 | (2) | 12,500 | 24,200 | 21,300 | 21,300 |
| 1 | (2) | 11,300 | 30,000 | 26,300 | 21,300 |
| 5 | (2) | 8,500 | 30,500 | 27,400 | 20,900 |
| 10 | (2) | 7,600 | 33,800 | 27,600 | 19,200 |

[1] Five plies of polyester resin with single plies of melamine resin on each surface.
[2] Less than 7,000 p. s. i.

Having thus described my invention, what I claim and desire to protect by Letters Patent is:

1. A fire-resistant laminar structure having a central reinforcement core impregnated with a hardened copolymer of an unsaturated alkyd resin with a miscible copolymerizable ethylenic compound containing the terminal group $CH_2=C<$, said impregnated reinforcement core being faced with a similar reinforcement core which is impregnated with hardened formaldehyde-melamine resin.

2. A fire-resistant laminar structure having a central reinforcement core of glass cloth impregnated with a hardened copolymer of a polyester which is essentially poly (ethylene maleate) and styrene, said impregnated reinforcement core being faced with a similar reinforcement core which is impregnated with hardened formaldehyde-melamine resin, whereby the color stability and the structural strength of the inner core is maintained and is thus substantially inseparably combined with a protective facing of superior fire resistance.

3. A fire-resistant laminar structure having a central reinforcement core of glass cloth impregnated with a hardened copolymer of a polyester which is essentially poly (ethylene maleate) and triallyl cyanurate, said impregnated reinforcement core being faced with a similar reinforcement core which is impregnated with hardened formaldehyde-melamine resin, whereby the color stability and the structural strength of the inner core is maintained and is thus substantially inseparably combined with a protective facing of superior fire resistance.

4. A fire-resistant laminar structure having a central reinforcement core of glass cloth impregnated with a hardened copolymer of a polyester which is essentially poly (ethylene maleate) and diallyl phthalate, said impregnated reinforcement core being faced with a similar reinforcement core which is impregnated with hardened formaldehyde-melamine resin, whereby the color stability and the structural strength of the inner core is maintained and is thus substantially inseparably combined with a protective facing of superior fire resistance.

5. A method of making a structurally strong laminar product which comprises impregnating a central layer of one or more plies of glass cloth with a liquid mixture of an unsaturated alkyd resin and a copolymerizable ethylenic compound, and applying thereto a facing of one or more plies of glass cloth impregnated with a formaldehyde-melamine resin, to form a composite construction, and then curing the assembled laminar structure to harden the respective resin binders and adhesively bond the plies together.

6. A fire-resistant laminar structure having a central glass-fibre reinforced layer impregnated with a hardened copolymer of an unsaturated polyester alkyd with a miscible copolymerizable compound selected from the class consisting of styrene, diallyl phthalate, and triallyl cyanurate, the unsaturated alkyd having an acid number below 100, said impregnated layer having an outer exposed facing of a similar reinforced layer which is impregnated with hardened formaldehyde-melamine resin, with good ply-adhesion between the interfaces of the two dissimilar hardened resins, and with maintenance of the color stability and structural strength of the said inner impregnated layer combined with the protective fire resistance of the said substantially inseparable impregnated outer facing.

ROBERT G. NELB.

REFERENCES CITED

The following references are of record in the file of this patent:

UNITED STATES PATENTS

| Number | Name | Date |
| --- | --- | --- |
| 2,439,929 | Hill et al. | Apr. 20, 1948 |
| 2,486,235 | Watt | Oct. 25, 1949 |
| 2,527,400 | Cooper | Oct. 24, 1950 |